Dec. 13, 1960     R. E. LATIMER     2,963,872
PROCESS AND APPARATUS FOR THE SEPARATION OF GAS MIXTURES
Filed March 14, 1957     2 Sheets-Sheet 1
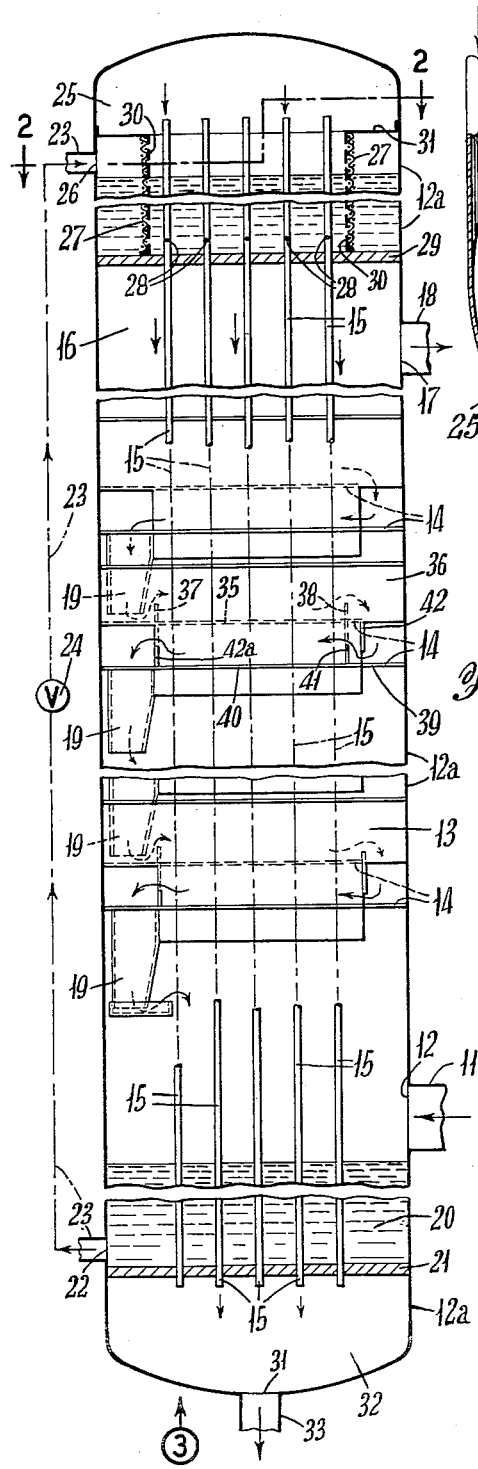
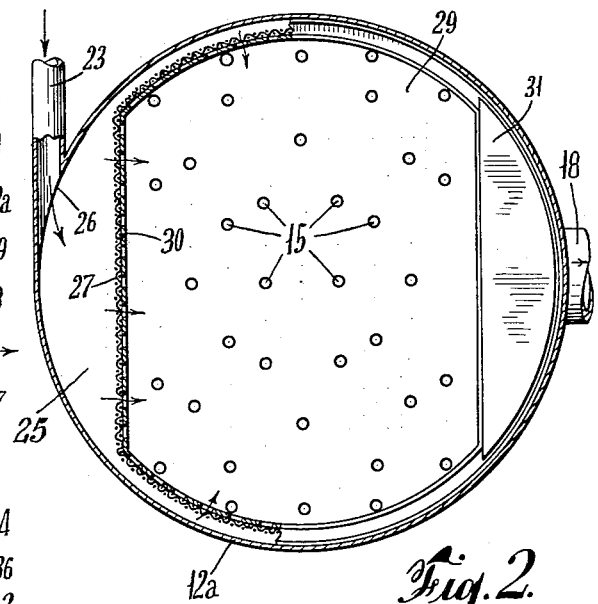
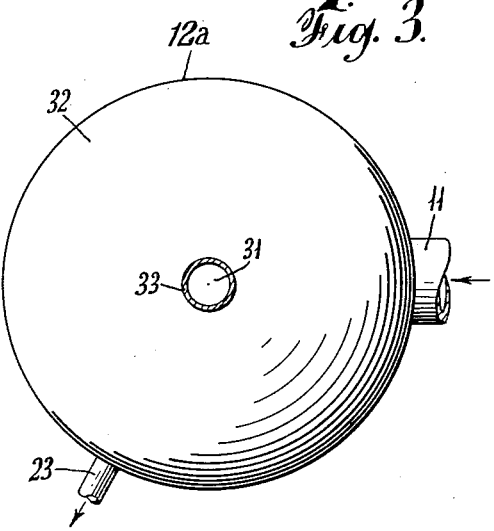
INVENTOR
ROBERT E. LATIMER
BY
*William F. Mesinger*
ATTORNEY

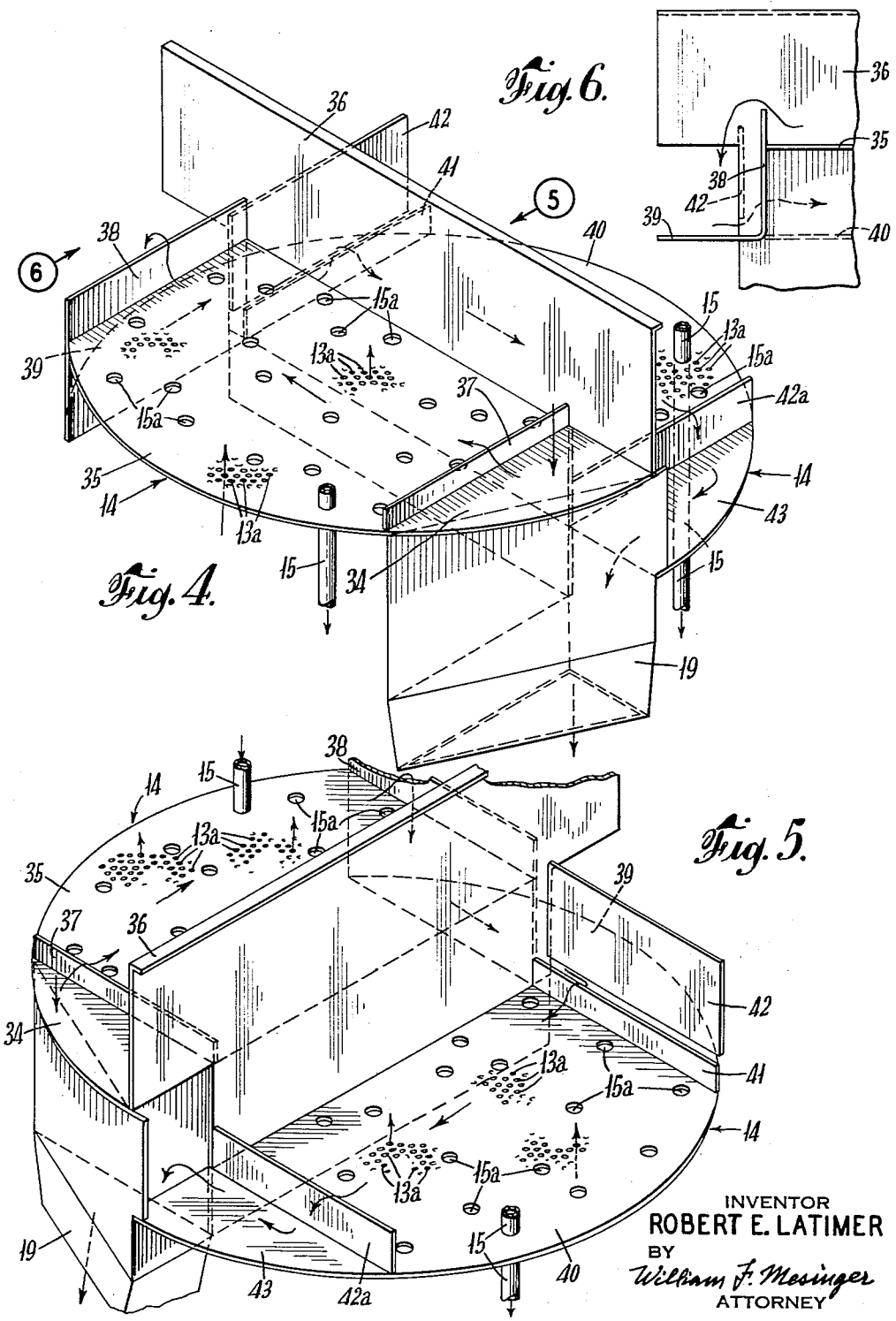

2,963,872

PROCESS AND APPARATUS FOR THE SEPARATION OF GAS MIXTURES

Robert E. Latimer, Kenmore, N.Y., assignor to Union Carbide Corporation, a corporation of New York Filed Mar. 14, 1957, Ser. No. 646,057

14 Claims. (Cl. 62—24)

This invention relates to a novel process and apparatus for the separation of gaseous mixtures. More particularly, it relates to a highly efficient and economical system in which a gas mixture may be partially condensed and rectified into lower and higher boiling constituents The invention is especially suited for the separation of air into components rich in oxygen and nitrogen, for example, 45 percent oxygen and 97 percent (or higher purity) nitrogen.

So-called "trickle condensers" for the production of low-purity 45 percent oxygen from air by low temperature condensation and rectification have been known for many years, and the basic process was originated by M. Fränkl, as disclosed in U.S.P. 1,963,840. However, the previously proposed trickle condensers have not been commercially adopted because of low efficiency and high investment costs. For example, if 45 percent oxygen is required as an oxygen-enriched air feed to the open hearth furnace of a steel plant, it has been found more economical to dilute 90 percent or higher purity oxygen with air to the desired 45 percent oxygen than to use the formerly proposed trickle condensers to make 45 percent oxygen initially.

Basically, the basic trickle condenser process includes the steps of feeding low pressure air below about 30 p.s.i.g. at or near its condensation temperature to the base of the trickle condenser condensing side whereupon it rises and is partially condensed and rectified by the counterflow of the condensed liquid and rising vapor, the uncondensed portion being drawn of the top as 97 percent (or higher purity) nitrogen gas. The rectified liquid flowing to the base containing approximately 45 percent oxygen is throttled to a lower pressure and transferred to a liquid distribution means at the top of the trickle condenser from whence it flows downward cocurrently with its vapor through separate passageways or conduits thermally associated with the fluids on the condensing side. The downwardly flowing liquid in the separate passageways is completely evaporated, such evaporation providing the necessary refrigeration for partial condensation of the incoming air on the condensing side of the trickle condenser. Thus, the 45 percent oxygen liquid is cocurrently evaporated and withdrawn from the bottom of the separate passageways as 45 percent oxygen gas.

The trickle condenser-cocurrent evaporator combination is a means of transferring heat from a condensing gas mixture to an evaporating liquid mixture with minimum irreversibility. An approach to reversible heat exchange is obtained because the descending evaporating liquid at first preferentially boils off more nitrogen than oxygen and its boiling temperature is lowest at the top of the separate passageways. The composition of the remaining liquid increases in oxygen so that the boiling temperature increases downwardly and is highest in the lower portions of the separate passageways. The ascending vapor on the condensing side gradually becomes richer in nitrogen so that its condensing temperature is highest at the lower end and lowest at the upper end. The net effect is a tendency towards constant temperature difference between the boiling liquid and the condensing vapor over the length of the rectification zone, which results in efficient heat transfer and low pressures. Also the pressure difference between the condensing and evaporating sides can be substantially lower than in conventional condenser-reboilers wherein boiling oxygen of highest purity must condense substantially pure nitrogen. The lower pressure difference permits a lower head pressure and consequently a power saving.

One serious problem in trickle condenser operation is obtaining intimate contact between liquid and vapor for efficient mass and heat exchange. Unless special equipment is used, the liquid on the condensing side will flow down the steep condenser-evaporator walls too rapidly for sufficient contact with the rising vapor. One partial solution to this problem that has been proposed is a system in which the air enters on the shell side of the vessel and the evaporating liquid passes through tubes inside the shell. Sheet metal strips in a U shape are used to press wire gauzes against inner walls of the tubes. The liquid flows down the tubes between the sheet-metal strips and the inner tube wall, and intimate mixing of the evaporating liquid and its vapor is obtained. This arrangement, however, does not provide intimate liquid-vapor contact on the incoming air shell side, or intimate heat exchange contact between the fluids on the shell and tube sides of the trickle condenser.

Another previously proposed system utilizes sheet metal insets in both the condensation and evaporation passageways. In the former, the insets are used to drain the liquid away from the condensing surfaces and minimize the thickness of the liquid film on the condensing surface. In the evaporation passageways the liquid is said to be conducted away from the walls by the insets and returned thereto by the shortest way. Thus, the evaporator walls are to be kept in a desirable moistened condition to accomplish initimate contact between the liquid and vapor. This system has an important disadvantage of high fabricating and investment costs.

A further disadvantage of such prior trickle condenser systems is liquid and vapor channeling on the air condensing side in the event of mal-distribution of liquid on the evaporating side. Thus, in a shell-and-tube type tickle condenser in which the air enters on the shell side and liquid is evaporated on the tube side, a serious problem of condensing side liquid and vapor channeling may arise if one of the tubes becomes plugged, preventing the passage of liquid therein. The vapor rising through the shell in the immediate vicinity of the plugged tube would not be condensed and rectified due to the lack of refrigeration. Such a situation decreases the overall efficiency of the process.

A principal object of this invention is to provide a process of and apparatus for low temperature combined partial condensation and rectification of a gas mixture, said process having the characteristics of high efficiency and low investment cost.

Another object is to provide an improved process and apparatus for low-temperature partial condensation and rectification of air into about 45 percent oxygen and 97 percent (or higher purity) nitrogen, said process having efficiency and low investment cost.

A further object is to provide a cocurrent evaporating countercurrent condensing-rectifying process and apparatus in which the liquids and vapors handled therein are maintained in intimate contact for efficient mass and heat exchange.

A still further object is to provide a device according to the invention which substantially eliminates the possibility of liquid and vapor channeling on the condensing side in the event of mal-distribution of liquid on the evaporating side.

In accordance with one embodiment of the present invention, a process is provided for the low-temperature separation of a gas mixture wherein the gas to be separated is passed at a predetermined low pressure to a zone comprising a series of condensation-rectification stages, and partially condensed in each stage by heat exchange with a condensing surface cooled by a colder fluid passing consecutively through all the stages from the colder to the warmer end of the zone. The condensate from this partial condensation is conducted down the condensing surface to an adjoining body of reflux liquid passing through the zone. The condensate is combined with the reflux liquid body to form an augmented reflux liquid body, and the latter is contacted with the incoming low pressure gas mixture for rectification of the two fluids to form an effluent gas enriched in the lower boiling constituents and a kettle liquid enriched in the higher boiling constituents.

Although the invention is hereinafter described specifically in terms of air separation, it is applicable to any system where partial separation is desired for one product (or waste) and substantially complete separation for another product. An example is the separation of propane from propane-butane mixtures.

It has been found that the efficiency of cocurrent evaporator, countercurrent condenser-rectifiers can be substantially improved by employing superimposed rectification trays on the condensing side for processing the incoming air to be partially condensed and rectified, and employing tubes substantially transverse to and piercing the rectification trays, such tubes extending lengthwise from the cold end to the warm end of the vessel for processing the throttled 45 percent oxygen liquid to be cocurrently evaporated. The incoming air enters the condensation-rectification zone through the bottom of the shell side of the device, rises through the vapor feed means of the bottom tray, and bubbles through the liquid reflux on the tray for rectification thereby. The vapor portion disengaging from the liquid reflux body on the tray then rises and passes in heat exchange contact with the tube section below the next higher tray and is partially condensed on the outer surfaces of the tubes. The condensate is conducted down the tube surface and combines with the reflux liquid to augment such reflux liquid body. Meanwhile, the uncondensed vapor rises through the vapor feed means of the next higher tray for further rectification and condensation in succeeding stages in an analogous manner, and the process is continued to the top of the condensation-rectification zone where the uncondensed vapor is withdrawn as effluent gas. The augmented reflux liquid descends through the liquid discharging means of each tray onto the next lower tray and stage, and so on to the bottom of the condensation-rectification zone of the device. There is thus provided sufficient liquid-vapor contact area for the descending reflux liquid to become saturated with oxygen at the bottom of the device and be in oxygen-nitrogen phase equilibrium with the incoming cold air. At the same time, the rising vapor is rectified and most of its oxygen removed so that the top effluent is at least 97 percent nitrogen. To provide refrigeration for this partial condensation, the liquid collecting in the kettle at the bottom of the shell side is withdrawn in a transfer line, throttled by a valve therein, admitted to the top of the device, and passed through a suitable distributor for downward cocurrent evaporation inside the tray-piercing tubes. This evaporating liquid absorbs the latent heat of the vapor condensing on the shell side, and the gaseous 45 percent oxygen is withdrawn from the bottom of the tubes. This system avoids the previously described disadvantage of the prior art trickle condensers, namely, low efficiency with high cost.

The rectification tray-piercing tube combination offers several important advantages. It provides an efficient means of obtaining intimate contact between liquid and vapor for mass and heat exchange. Since the trays are located at short uniform intervals between the cold and warm ends of the device and the piercing tubes extend the entire end-to-end length of the condensation-rectification zone of the device, the condensate running down the outer wall of the tubes is collected at relatively short uniform intervals by the trays and augments the reflux liquid on the tray of each stage. This collection minimizes the thickness of the liquid film on the condensing side of the tubes and maximizes the overall heat transfer coefficient between the condensing air and the evaporating 45 percent oxygen liquid. If the tubes were used without the rectification tray condensate collection means, the condensate would simply run down the tubes to the bottom of the device and the thickness of the liquid film on the outer wall of the tubes would progressively increase from top to bottom. The net effect would be relatively inefficient transfer of heat from condensing air to evaporating 45 percent oxygen liquid through a thick liquid film. Furthermore, the trays permit the use of straight tubes instead of helical coils, the former being less expensive to install.

The rectification tray-piercing tube combination also permits efficient mass and heat exchange between the rising vapor and the descending liquid on the condensing side of the device. Thus, the vapor rising through the vapor feed means of each tray bubbles through the liquid reflux in intimate contact therewith so that the vapor becomes more concentrated in lower-boiling nitrogen and the descending liquid becomes more concentrated in higher-boiling oxygen. Without the rectification trays the rising vapor would only contact the descending liquid directly on the condensing surface of the tubes, which is inadequate since the tubes occupy a relatively small fraction of the cross-sectional area of the device. By using rectification trays the liquid-vapor contact area on the condensing side is extended throughout a large fraction of the cross-sectional area of the device.

Another advantage of the present invention is that no special means of uniformly distributing the incoming air across the base of the condensation-rectification zone is required. This function is performed by the bottom distillation tray which, for example, may contain perforations uniformly spaced throughout the tray area as the vapor feed and the liquid-vapor contacting means. If packing were used instead of trays as the rectification means, special equipment would be required to insure uniform vapor distribution and such equipment increases the expense and complexity of the air separation system.

Still another advantage of the present invention is substantial elimination of liquid and vapor channeling on the condensing side of the device. If one of the evaporating tubes becomes plugged, there is only a slight effect on the overall efficiency of the process because the reflux liquid on the trays is substantially uniformly distributed across the tray area, including the section immediately surrounding the plugged tube. Since the rising vapor bubbles through substantially the same depth of liquid in this section as it does in the remainder of the tray area, the possibility of vapor channeling is substantially eliminated. Also, the possibility of liquid channeling is very remote as the liquid can only leave the trays through the liquid discharge portion of each tray.

The process and apparatus of the present invention may, for example, be incorporated in a gas separation cycle of the general type disclosed by M. Frankl in U.S.P. 2,084,334. In this cycle, incoming air is cooled in regenerators by outgoing products separated from the air in the trickle condenser.

We now refer to the accompanying drawings in which:
Fig. 1 is a view of a vertical longitudinal section of a device according to the invention in which the rectification tray-piercing tube assembly for processing the air is represented schematically.

Fig. 2 is an enlarged cross-sectional view of the top part of the device illustrated in Fig. 1 along the line 2—2.

Fig. 3 is an enlarged bottom view of the same device looking upward from point 3 in Fig. 1.

Fig. 4 is an enlarged isometric view of one stage of the rectification tray-piercing tube assembly of the same device looking downwardly towards the liquid receiving portion of the upper level of the tray.

Fig. 5 is an enlarged isometric view of one stage of the rectification tray-piercing tube assembly of the same device looking downward from point 5 in Fig. 4 towards the liquid discharging portion of the lower level of the tray.

Fig. 6 is a view on an enlarged scale of a fragmentary section showing communicating means between the upper and lower levels of the Fig. 5 assembly looking from point 6.

Referring more specifically to Figs. 1, 2 and 3, a co-current evaporator, countercurrent condenser-rectifier according to the invention is illustrated, wherein cold clean air in conduit 11 at low pressure, for example, 21 p.s.i.g., and approximately saturation temperature at this pressure, e.g. −183° C., enters the device through hole 12 in the shell and rises into the first condensation-rectification stage of zone 13 through perforations 13a in the lowest of the sieve trays 14. The cold air emerging on top of this sieve tray 14 bubbles through the liquid reflux body on the tray and is rectified by direct mass and heat exchange with such liquid body. The uncondensed vapor portion disengaging from the reflux liquid body rises in heat exchange contact with the outer surface of the tubes 15 which extend substantially the full end-to-end length of the vessel and pass perpendicularly through each of the stages and superimposed trays 14. This uncondensed vapor portion is partially condensed on the outer surface of the tubes 15 and conducted down the tubes to the adjoining body of reflux liquid traversing the sieve tray 14. The condensate then combines with and augments the reflux liquid body. The uncondensed vapor rises to the next higher tray 14 and passes through its perforations 13a for rectification and condensation in an analogous manner. The vapor rising from the uppermost of the sieve trays 14 into the upper section 16 of the shell side of the device is further partially condensed by heat exchange contact with the tubes 15 above the top tray. The uncondensed vapor by the time it reaches this level contains very little of the higher boiling constituent oxygen, and may be, for example, 97 percent nitrogen or higher purity. This effluent emerges through a pipe connection hole 17 in the shell 12a of the device into pipe 18, and may be processed as desired, for example, used to cool and clean incoming air in regenerators with subsequent discharge to the atmosphere as waste gas or delivery to a consuming means as product gas.

The augmented reflux liquid on each tray flows laterally across the tray and descends to the next lower tray through downcomers 19 for rectification thereon. Sufficient liquid-vapor contact area is provided in the condensation-rectification zone 13 so that the oxygen-enriched rectified liquid reaching the bottom of this zone is substantially in oxygen-nitrogen phase equilibrium with the incoming air and may comprise, for example, 45 percent oxygen. The liquid descending through the downcomer 19 of the bottom tray falls into kettle 20, the lower end of which is sealed by the lower tube header 21.

The kettle liquid is continuously withdrawn through a pipe connection hole 22 in the shell 12a of kettle 20 into liquid transfer conduit 23. A throttling valve 24 in the conduit 23 reduces the pressure of the 45 percent oxygen kettle liquid to approximately 3 p.s.i.g., after which the throttled liquid in conduit 23 enters the metering pot 25 tangentially through pipe connection hole 26 in the shell 12a. The throttled liquid in the metering pot 25 passes consecutively through a wire mesh screen 27 and a perforated sheet 30 which are concentrically placed relative to the center line of the metering pot 25, and extend around the outer side of the piercing tubes 15. The wire mesh screen 27 is wrapped around and tacked to the perforated sheet 30 which in turn is metal bonded to a top flange 31 which is braced against and metal bonded to the inner side of the shell 12a. The lower end of the perforated sheet 30 is flanged against and metal bonded to the top surface of the upper tube header 29 for stability and to prevent liquid from leaking under the wire screen assembly. The throttled liquid having passed through this assembly is distributed through orifices 28 in the tubes 15 to the upper portion of such tubes above the upper tube header 29. The tubes 15 are preferably uniformly spaced across the surface area of this header 29 and the distillation or rectification trays 14 below. The wire mesh screen 27 prevents passage of particles which might plug up the orifices 28. These orifices 28 are preferably of uniform size and located in the tube walls in the same horizontal plane above the upper tube header 29, the liquid being metered through the orifices 28 into each tube 15. The tubes 15 extend above the orifices 28 and the metering pot liquid level, and the top end of the tubes 15 is left open to admit any vapor formed by throttling the kettle liquid from the condensing pressure to the evaporating pressure. The open tube ends also assure that an equal pressure drop is maintained across all of the orifices. This arrangement provides a uniform head of liquid above the uniformly sized orifices 28 and therefore facilitates equal distribution of the throttled kettle liquid to the tubes which is essential for high efficiency operation.

The throttled kettle liquid entering the orifices 28 passes down through the tubes 15 piercing the rectification trays 14, and the liquid is cocurrently evaporated therein by indirect heat exchange with vapor condensing on the shell side of the device. If desired, tube inserts or baffles may be used for further control of the evaporating liquid flow downwardly through the tubes. The descending evaporating liquid first condenses vapor in the upper section 16 of the shell side of the device, above the uppermost rectification tray 14. The throttled evaporating liquid in the piercing tubes then continues downwardly flowing through the condensation-rectification zone 13 and absorbs the latent heat of the condensing vapor. The throttled liquid is preferentially completely evaporated in the tubes 15. The resulting 45 percent oxygen gas passes through the lower tube header 21 and emerges through a hole 31 in the lower shell header 32 of the device into withdrawal conduit 33 for further processing as desired.

Referring now to Fig. 4, an enlarged isometric view of one stage of the rectification tray-piercing tube assembly, the liquid from the liquid discharge portion of the next higher tray enters the liquid receiving section 34 of the upper level 35 of the tray. This section of the tray is without perforations and is bounded by a relatively high partition 36 and a relatively low inlet dam or weir 37. The liquid overflowing the upper level inlet weir 37 passes onto the active perforated section of the upper level 35 of the tray and flows across this section to the discharge weir 38. This weir is higher than the inlet weir 37 so as to maintain the desired liquid depth on the active section of the upper tray level 35. The liquid overflowing the upper level discharge weir 38 drops down the weir wall to the unperforated transfer section 39 of the tray which is at the same height as the lower level 40 of the tray and is separated therefrom by the lower level inlet weir 41.

Referring now to Fig. 5, an enlarged isometric view of the same stage of the rectification tray-piercing tube assembly looking towards the liquid discharging portion of the tray, a baffle 42 across the lower level 40 of the tray is located perpendicular to the center partition 36 and above the lower level inlet weir 41. This baffle 42 prevents the liquid flowing around the transfer section 39 from foaming up towards the lower side of the next higher tray and becoming entrained in the rising vapor, thereby bypassing part of the active section of the lower level 40 of the tray. Thus, the liquid from the transfer segment 39 flows smoothly onto the tray over the lower level inlet weir 41 and under the baffle 42. The liquid flows across the active perforated section of lower level 40 to the discharge weir 42a. This weir is higher than the lower level inlet weir 41 so as to maintain the desired liquid depth on the active section of the lower level 40 of the tray. The liquid overflowing the lower level discharge weir 42a enters the unperforated liquid discharge portion 43 of the tray and is fed through the downcomer 19 to the liquid receiving portion of the next lower tray.

The perforations 13a on the tray are of such number and size that the liquid does not pass downwardly through them. The gas rising from the next lower tray passes through the perforations 13a and bubbles through the reflux liquid for rectification. The tubes 15 extend substantially the entire end-to-end length of the device perpendicular to the trays and pass through holes 15a in such trays. The clearance between the tray holes 15a and the outer diameter of the tubes 15 is minimized to avoid liquid leakage between the trays.

In Fig. 6 a view on an enlarged scale of a fragmentary section showing the communicating means between the upper and lower levels of the tray assembly, the liquid from the upper level 35 passes over the upper level discharge weir 38 to the unperforated transfer section 39. This liquid then enters the lower level 40 of the tray by flowing over the lower level inlet weir 41 and under the baffle 42.

Although a bi-level tray has been described and illustrated, any convenient number of levels could be used in the present invention. Multi-level trays are preferred for large diameter columns to avoid too large a gradient in liquid depth on any level, thus avoiding leakage of liquid downward through the perforations due to excessive differences in liquid depth in some areas. Single-level trays could be used but are more suitably adapted to small diameter columns for which the liquid gradient is small across the entire tray.

Oxygen-enriched air of any composition up to approximately 45 percent oxygen may be produced with this invention, the upper limit being the oxygen concentration of the kettle liquid in equilibrium with the entering air. The corresponding nitrogen effluent purity in this case is approximately 98 percent. If desired, the device may alternatively be operated so as to produce high purity nitrogen, e.g., 99.5 percent, by, for example, increasing the rate of liquid transfer to the evaporating tubes. Operating in this manner, and without increasing the plant air pressure, the corresponding purity of the oxygen-enriched air would be reduced to 39 percent oxygen or lower, depending on the number of trays used.

Although preferred embodiments of the invention have been described in detail, it is contemplated that modifications of the process and the apparatus may be made and that some features may be employed without others, all within the scope of the invention and the scope thereof as set forth in the claims. For example, straight tubes have been described as the means for conveying the evaporating throttled kettle liquid from the cold end to the warm end of the device, but helical or serpentine coils could be used instead. However, investment costs would be substantially higher because of the inherent difficulty in assembling a helical coil-pierced tray structure. The straight tubes, on the other hand, may be slipped relatively easily through the tray assembly.

Another variation is the use of bubble-cap type trays instead of sieve-type trays. The main disadvantages of bubble cap trays are higher investment cost and lower overall efficiency.

A still further variation comprises operating the evaporating side under a vacuum by, for example, attaching a vacuum pump to the oxygen-enriched air withdrawal conduit and drawing or sucking this gas from the bottom of the device. In this case, the head pressure of the incoming air could be substantially less than 21 p.s.i.g., and just sufficient to provide the necessary temperature difference for efficient heat transfer between the incoming air on the condensing side and the liquid on the evaporating side. For example, an evaporating side operating pressure of 7 p.s.i.a. would require a condensing side pressure of approximately 0.2 to 0.5 p.s.i.g. for efficient heat transfer between the fluids.

What is claimed is:

1. In a process for the low-temperature separation of a gas mixture wherein the gas to be separated is provided at a low pressure and cooled to substantially saturation temperature at said low pressure; the steps including passing the low pressure gas mixture to a zone comprising a series of condensation-rectification stages, partially condensing said low pressure gas mixture in each of said condensation-rectification stages by heat exchange with a condensing surface cooled by a colder fluid passing consecutively through all the stages from the colder to the warmer end of said zone, conducting the condensate of the partial condensation as it is formed down the condensing surface to an adjoining body of reflux liquid in each stage where the condensate was produced thereby momentarily retaining the condensate in such stage, combining the downwardly conducted liquid condensate with the reflux liquid body to form an augmented reflux liquid body, and rectifying such augmented liquid body and incoming low pressure gas mixture by bubbling the gas mixture through the liquid body in each stage and thereafter passing said liquid body to the next lower stage to form an effluent gas enriched in the lower boiling constituents and a kettle liquid enriched in the higher boiling constituents.

2. In a process for the low-temperature separation of a gas mixture wherein the gas to be separated is provided at a first low pressure and cooled to substantially saturation temperature at said first low pressure; the steps including passing the first low pressure gas mixture to a zone comprising a series of condensation-rectification stages, partially condensing said first low pressure gas mixture in each of said condensation-rectification stages by heat exchange with a condensing surface cooled by a colder fluid, conducting the condensate of the partial condensation as it is formed down the condensing surface to an adjoining body of reflux liquid in each stage where the condensate was produced thereby momentarily retaining the condensate in such stage, combining the downwardly conducted liquid condensate with the reflux liquid body to form an augmented reflux liquid body, rectifying such augmented liquid body and incoming first low pressure gas mixture by bubbling the gas mixture through the liquid body in each stage and thereafter passing said liquid body to the next lower stage to form an effluent gas enriched in the lower boiling constituents and a kettle liquid enriched in the higher boiling constituents, withdrawing said effluent gas from a colder part of the condensation-rectification zone, withdrawing said kettle liquid from a warmer part of the condensation-rectification zone, providing said colder fluid by throttling the withdrawn kettle liquid from said first low pressure to a second low pressure, and passing this liquid consecutively through said condensation-rectification stages in heat exchange contact with the condensing surface from the colder to the warmer end of said zone.

3. In a process for the low-temperature separation of a gas mixture wherein the gas to be separated is provided at a first low pressure and cooled to substantially saturation temperature at said first low pressure; the steps including passing the first low pressure gas mixture to a zone comprising a series of condensation-rectification stages, partially condensing said first low pressure gas mixture in each of said condensation-rectification stages by heat exchange with a condensing surface cooled by a colder fluid, conducting the condensate of the partial condensation as it is formed down the condensing surface to an adjoining body of reflux liquid in each stage where the condensate was produced thereby momentarily retaining the condensate in such stage, transferring the downwardly conducted condensate from the condensing surface to the reflux liquid body to form an augmented reflux liquid body, rectifying such augmented liquid body and incoming first low pressure gas mixture by bubbling the gas mixture through the liquid body in each stage and thereafter passing said liquid body to the next lower stage to form an effluent gas enriched in the lower boiling constituents and a kettle liquid enriched in the higher boiling constituents, withdrawing said effluent gas from a colder part of said condensation-rectification zone, withdrawing said kettle liquid from a warmer part of said condensation-rectification zone, providing said colder fluid by throttling the withdrawn kettle liquid from said first low pressure to a second low pressure and passing the liquid to the colder end of said condensing surface, cocurrently evaporating the throttled withdrawn kettle liquid by consecutively passing such liquid in heat exchange contact with said condensing surface through all of said condensation-rectification stages from the colder to the warmer end of said zone, and withdrawing the evaporated liquid as gaseous product enriched in the higher boiling constituents of said gas mixture.

4. In a process for the low-temperature separation of a gas mixture wherein the gas to be separated is provided at a low pressure and cooled to substantially saturation temperature at said low pressure, the steps including passing the low pressure gas mixture to a zone comprising a series of condensation-rectification stages, partially condensing and rectifying said low pressure gas mixture by direct mass and heat exchange with a body of reflux liquid in each stage where the condensate was produced thereby momentarily retaining the condensate in such stage, further partially condensing the uncondensed portion of said low pressure gas mixture in said zone by heat exchange with a condensing surface cooled by a colder fluid passing consecutively through all the stages from the colder to the warmer end of said zone, conducting the condensate of such further partial condensation as it is formed down the condensing surface to said body of reflux liquid, combining the downwardly conducted condensate with the reflux liquid body to form an augmented reflux liquid body, and rectifying such augmented liquid body and incoming low pressure gas mixture by bubbling the gas mixture through the liquid body in each stage and thereafter passing said liquid body to the next lower stage to form an effluent gas enriched in the lower boiling constituents and a kettle liquid enriched in the higher boiling constituents.

5. Apparatus for the low-temperature separation of a gas mixture including a condensation-rectification column, a zone within such column comprising a series of condensation-rectification stages consisting of superimposed rectification trays which provide a downward flow means for a reflux liquid passing through said zone, and a plurality of separate passageways substantially transverse to and piercing the trays and extending from a colder part to a warmer part of the zone for passage of a colder fluid therein, and means for passing cold gas mixture at a predetermined low pressure to the warmer part of said zone for passage therethrough as well as partial condensation and rectification in each stage by indirect heat exchange with said colder fluid in said plurality of separate passageways and direct mass and heat exchange with said reflux liquid to form an effluent gas enriched in the lower boiling constituents and a kettle liquid enriched in the higher boiling constituents.

6. Apparatus for the low-temperature separation of a gas mixture including a condensation-rectification column, a zone within such column comprising a series of condensation-rectification stages consisting of superimposed rectification trays which provide a downward flow means for a reflux liquid passing through said zone, and a plurality of separate passageways substantially transverse to and piercing the trays and extending from a colder part to a warmer part of the zone for passage of a colder fluid therein, means for passing cold gas mixture at a predetermined low pressure to the warmer part of said zone for passage therethrough as well as partial condensation and rectification in each stage by indirect heat exchange with said colder fluid in said plurality of separate passageways and direct mass and heat exchange with said reflux liquid to form an effluent gas enriched in the lower boiling constituents and a kettle liquid enriched in the higher boiling constituents, and means for throttling said kettle liquid from said predetermined low pressure to a second lower pressure to serve as said colder fluid.

7. Apparatus for the low-temperature separation of a gas mixture including a condensation-rectification column, a zone within such column comprising a series of condensation-rectification stages consisting of superimposed rectification trays which provide a downward flow means for a reflux liquid passing through said zone and a plurality of separate passageways transverse to and piercing the trays and extending from a colder part to a warmer part of the zone for passage of a colder fluid which is cocurrently evaporated therein, means for passing cold gas mixture at a predetermined low pressure to the warmer part of said zone for passage therethrough as well as partial condensation and rectification in each stage by indirect heat exchange with the cocurrently evaporating colder fluid in said plurality of separate passageways and direct mass and heat exchange with said reflux liquid to form an effluent gas enriched in the lower boiling constituents and a kettle liquid enriched in the higher boiling constituents, means for throttling said kettle liquid from said predetermined low pressure to a second lower pressure, means for passing the throttling kettle liquid into the colder end of said plurality of separate passageways as said colder fluid which is cocurrently evaporated therein, and means for discharging the cocurrently evaporated colder fluid from the warmer end of the separate passageways.

8. Apparatus for the low-temperature separation of a gas mixture including a condensation-rectification column, a zone within such column comprising a series of condensation-rectification stages consisting of superimposed rectification trays which provide a downward flow means for a reflux liquid passing through said zone and a plurality of separate passageways substantially transverse to and piercing the trays and extending from a colder part to a warmer part of the zone for passage of a colder fluid which is cocurrently evaporated therein, means for passing cold gas mixture at a predetermined low pressure to the warmer part of said zone for passage therethrough as well as partial condensation and rectification in each stage by indirect heat exchange with the cocurrently evaporating colder fluid in said plurality of separate passageways and direct mass and heat exchange with said reflux liquid to form an effluent gas enriched in the lower boiling constituents and a kettle liquid enriched in the higher boiling constituents, means comprising the outer surface of said separate passageways for conducting the condensate of the partial condensation as it is formed to said reflux liquid so as to augment such liquid, means for throttling said kettle liquid from said predetermined low pressure to a second lower pressure, means for passing the throttled kettle liquid into the colder end of said plurality of separate passageways as said colder fluid which is cocurrently evaporated therein, and means for discharging the cocurrently evaporated colder fluid from the warmer end of the separate passageways.

9. Apparatus for the low-temperature separation of a gas mixture including a condensation-rectification column, a zone within such column comprising a series of condensation-rectification stages consisting of superimposed perforated sieve-type rectification trays which provide a downward flow means for a reflux liquid passing through said zone, and a plurality of straight tubes substantially normal to and piercing the trays and extending from a colder part to a warmer part of the zone for passage of a colder fluid which is cocurrently evaporated therein, means for passing cold gas mixture at a predetermined low pressure to the warmer part of said zone for passage therethrough as well as partial condensation and rectification in each stage by indirect heat exchange with the cocurrently evaporating colder fluid in said plurality of straight tubes and direct mass and heat exchange with said reflux liquid to form an effluent gas enriched in the lower boiling constituents and a kettle liquid enriched in the higher boiling constituents, means comprising the outer surface of said straight tubes for conducting the condensate of the partial condensation as it is formed to said reflux liquid so as to augment such liquid, means for throttling said kettle liquid from said predetermined low pressure to a second lower pressure, means for passing the throttled kettle liquid into the colder end of said plurality of straight tubes as said colder fluid which is cocurrently evaporated therein, and means for discharging the cocurrently evaporated colder fluid from the warmer end of the straight tubes.

10. Apparatus for the low-temperature separation of air including a condensation-rectification column, a zone within such column comprising a series of condensation-rectification stages consisting of superimposed perforated sieve-type rectification trays which provide a downward flow means for a reflux liquid passing through said zone, and a plurality of straight tubes substantially normal to and piercing the trays and extending from a colder part to a warmer part of the zone for passage of a colder fluid which is cocurrently evaporated therein, liquid distribution means at the colder end of said zone serving to uniformly distribute said colder fluid to said straight tubes, means for passing cold air at a predetermined low pressure to the warmer part of said zone for passage therethrough as well partial condensation and rectification in each stage by indirect heat exchange with said colder fluid in said plurality of straight tubes and direct mass and heat exchange with said reflux liquid to form a nitrogen-rich effluent gas and an oxygen-enriched kettle liquid, means comprising the outer surface of said straight tubes for conducting the condensate of the partial condensation as it is formed to said reflux liquid so as to augment said liquid, means for throttling the kettle liquid from said predetermined low pressure to a second lower pressure, means for passing the throttled kettle liquid to the liquid distributor as said colder fluid which is cocurrently evaporated in the straight tubes, and means for discharging such fluid from the warmer end of the straight tubes as an oxygen-enriched air product.

11. In a condensation-rectification column for the separation of a gas mixture, a zone comprising a series of condensation-rectification stages consisting of superimposed rectification trays and a plurality of separate passageways substantially transverse to and piercing the rectification trays, the outer walls of such passageways being liquid sealed against the rectification trays for collection of condensate in each stage, means for introducing said gas mixture at the base of said zone so as to rise through said rectification trays, and means for introducing a fluid colder than said gas mixture at the cold end of said separate passageways for flow therethrough to the warm end of such passageways to refrigerate said zone.

12. In a condensation-rectification column for the low-temperature separation of a gas mixture, a zone comprising a series of condensation-rectification stages consisting of superimposed rectification trays each with an upper and a lower liquid-gas contact level and a liquid-tight partition separating such levels, a liquid receiving section on each upper level, a radially turning liquid communicating passage between the upper level and the lower level being arranged and constructed so that the liquid flows in opposite directions across consecutive upper and lower levels, and a liquid discharge section on each lower level, and means comprising a plurality of separate passageways substantially normal to and piercing the upper and lower liquid-gas contact levels of such trays for conducting a cold fluid from the colder end to the warmer end of said zone for refrigeration thereof.

13. In a condensation-rectification column for the low-temperature separation of a gas mixture, a zone comprising a series of condensation-rectification stages consisting of superimposed rectification trays each with at least two liquid-gas contact levels and liquid-tight partitions separating such levels, liquid receiving and liquid discharge sections on each tray and radially turning liquid communicating passages between consecutive levels being arranged and constructed so that the liquid flows in different directions across said consecutive levels, and means comprising a plurality of separate passageways substantially normal to and piercing the liquid-gas contact levels of such trays for conducting a cold fluid from the colder end to the warmer end of said zone for refrigeration thereof.

14. In a condensation-rectification column for the low-temperature separation of air, a zone comprising a series of condensation-rectification stages consisting of superimposed sieve-type rectification trays each with an upper and lower liquid-gas contact level and a liquid-tight partition separating such levels, a liquid receiving portion on each upper level, a radially turning liquid communicating passage between the upper level and the lower level being arranged and constructed so that the liquid flows in opposite directions across consecutive upper and lower levels, and a liquid discharge portion on each lower level, and means comprising a plurality of straight tubes normal to and piercing the upper and lower liquid-gas contact levels of such trays for conducting a cocurrently evaporating cold fluid from the colder end to the warmer end of said zone for refrigeration thereof.

References Cited in the file of this patent

UNITED STATES PATENTS

| | | |
|---|---|---|
| 1,119,312 | Pictet | Dec. 1, 1914 |
| 1,323,014 | Claude | Nov. 25, 1919 |
| 1,537,193 | Roberts | May 12, 1925 |
| 1,963,840 | Frankl | June 19, 1934 |
| 2,084,334 | Frankl | June 22, 1937 |
| 2,176,498 | Hickman | Oct. 13, 1939 |
| 2,197,199 | Welch | Apr. 16, 1940 |
| 2,482,304 | Van Nuys | Sept. 20, 1949 |
| 2,510,590 | Kraft | June 6, 1950 |
| 2,627,731 | Benedict | Feb. 10, 1953 |

FOREIGN PATENTS

| | | |
|---|---|---|
| 496,066 | Germany | Apr. 16, 1930 |
| 683,008 | Great Britain | Nov. 19, 1952 |